United States Patent
Wang et al.

(10) Patent No.: US 9,058,171 B2
(45) Date of Patent: Jun. 16, 2015

(54) DATA PROCESSING METHOD, AND RELEVANT DEVICES

(71) Applicant: HUAWEI TECHNOLOGIES CO., LTD., Shenzhen (CN)

(72) Inventors: Yong Wang, Shanghai (CN); Xiaoming Shi, Shanghai (CN); Gang Li, Shanghai (CN); Zhufa Shao, Shanghai (CN)

(73) Assignee: HUAWEI TECHNOLOGIES CO., LTD., Shenzhen (KR)

( * ) Notice: Subject to any disclaimer, the term of this patent is extended or adjusted under 35 U.S.C. 154(b) by 0 days.

(21) Appl. No.: 13/955,235

(22) Filed: Jul. 31, 2013

(65) Prior Publication Data

US 2013/0314264 A1  Nov. 28, 2013

Related U.S. Application Data

(63) Continuation of application No. PCT/CN2012/070569, filed on Jan. 19, 2012.

(30) Foreign Application Priority Data

Jan. 31, 2011 (CN) .......................... 2011 1 0033987

(51) Int. Cl.
*H03M 1/12* (2006.01)
*G06F 1/32* (2006.01)
*G06F 3/05* (2006.01)

(52) U.S. Cl.
CPC ............ *G06F 1/3253* (2013.01); *G06F 3/05* (2013.01); *G06F 1/3287* (2013.01); *Y02B 60/1235* (2013.01); *Y02B 60/1282* (2013.01)

(58) Field of Classification Search
CPC ...... G06F 1/3287; G06F 1/3253; H03M 1/24; H04L 5/1692; H04L 5/0053; G11C 11/22; G11C 11/5628; G11C 16/3404

USPC ........... 370/336; 365/185.03, 185.18, 185.22, 365/185.23, 185.24, 190, 145, 208, 203; 375/288, 298, 299; 341/110–155
See application file for complete search history.

(56) References Cited

U.S. PATENT DOCUMENTS 5,377,151 A * 12/1994 Komuro ..................... 365/208
6,026,014 A *  2/2000 Sato et al. ................ 365/185.03

(Continued)

FOREIGN PATENT DOCUMENTS

| CN | 1649273 | 8/2005 |
|---|---|---|
| CN | 1703911 | 11/2005 |

(Continued)

OTHER PUBLICATIONS

Tutorial: *Basics of choosing and designing the best filter for an effective data-acquisition system*, Planet Analog, XP5510328A, Aug. 10, 2006 (6 pp.).

(Continued)

*Primary Examiner* — Lam T Mai
(74) *Attorney, Agent, or Firm* — Staas & Halsey LLP (57) ABSTRACT

A data processing method, a data processing system, and relevant devices are provided, which are used to reduce system power consumption. The method in embodiments of the present invention includes: performing sampling on an analog signal to obtain an analog sample value; performing analog-to-digital conversion on the analog sample value to obtain a digital signal; dividing bits forming the digital signal into at least two bit groups; and turning off output of bits in at least one bit group if a preset turnoff condition is satisfied. A data processing system and relevant devices are further provided.

24 Claims, 3 Drawing Sheets

(56) References Cited

U.S. PATENT DOCUMENTS

| | | | |
|---|---|---|---|
| 6,344,812 B1* | 2/2002 | Takeda et al. | 341/143 |
| 6,717,839 B1* | 4/2004 | Du | 365/145 |
| 7,193,553 B1 | 3/2007 | Bahai | |
| 2004/0051652 A1* | 3/2004 | Nakao et al. | 341/100 |
| 2005/0041874 A1 | 2/2005 | Langelaar et al. | |
| 2005/0162301 A1 | 7/2005 | Mizumasa et al. | |
| 2005/0258893 A1 | 11/2005 | Garlapati et al. | |
| 2008/0211703 A1 | 9/2008 | Tsuchi | |
| 2008/0307163 A1 | 12/2008 | Hung et al. | |

FOREIGN PATENT DOCUMENTS

| | | |
|---|---|---|
| CN | 1889694 | 1/2007 |
| CN | 1960187 | 5/2007 |
| CN | 101174837 | 5/2008 |
| CN | 101783682 | 7/2010 |
| CN | 102170292 | 8/2011 |
| JP | 2001-257731 | 9/2001 |
| JP | 2001-339455 | 12/2001 |
| JP | 2005-236867 | 9/2005 |

OTHER PUBLICATIONS

Extended European Search Report, dated Mar. 5, 2014, in corresponding European Application No. 12741633.7 (9 pp.).

Japanese Office Action mailed Aug. 5, 2014 in corresponding Japanese Patent Application No. 2013-550748.

International Search Report mailed Apr. 26, 2012 for corresponding International Application No. PCT/CN2012/070569.

Form PCT/ISA/210, dated Apr. 26, 2012, in corresponding International Application No. PCT/CN2012/070569 (3 pp.).

Form PCT/ISA/220, dated Apr. 26, 2012, in corresponding International Application No. PCT/CN2012/070569 (3 pp.).

Form PCT/ISA/237, dated Apr. 26, 2012, in corresponding International Application No. PCT/CN2012/070569 (5 pp.).

Office Action, dated Feb. 5, 2013, in corresponding Chinese Application No. 201110033987.3 (7 pp.).

Office Action, dated Aug. 27, 2013, in corresponding Chinese Application No. 201110033987.3 (7 pp.).

* cited by examiner

DATA PROCESSING METHOD, AND RELEVANT DEVICES

CROSS-REFERENCE TO RELATED APPLICATIONS

This application is a continuation of International Application No PCT/CN2012/070569, filed on Jan. 19, 2012, which claims priority to Chinese Patent Application No. 201110033987.3, filed on Jan. 31, 2011, all of which are hereby incorporated by reference in their entireties.

TECHNICAL FIELD

The present invention relates to the field of data processing, and in particular, to a data processing method, and relevant devices.

BACKGROUND

With development of network technologies, data transmission rates are increasing. In response to this trend, the sampling rate of an analog to digital converter (ADC, Analog to Digital Converter) is also increasing.

Nowadays, various data processing devices are highly digitalized. Therefore, a large amount of devices, such as a frequency spectrum analyzer and a power analyzer, needs to be connected to an ADC to obtain a digital signal for subsequent processing.

The ADC performs sampling on an analog signal to obtain an analog sample value and converts the analog sample value to a group of digital signals by performing analog-to-digital conversion. During each sampling cycle, the ADC obtains one analog sample value by performing sampling, and outputs a group of digital signals to subsequent a data processing device for processing.

For example, the sampling rate of an ADC is 100 Hz, which means that the ADC obtains 100 analog sample values per second; the resolution of analog-to-digital conversion is eight bits, which means that each analog sample value is quantized by using eight bits. The ADC converts one analog sample value to an 8-bit digital signal and outputs a total of 800 bits per second. That is to say, the rate of an interface for outputting digital signals on the ADC is 0.8 Kbps. Therefore, a subsequent data processing device connected to the ADC also needs to receive a digital signal at this interface rate, and processes each bit of the digital signal.

When the sampling rate of the ADC increases, the rate of the interface for outputting digital signals on the ADC also increases. To match the increased rate for outputting digital signals, a data processing device connected to the ADC must work at a high rate, thereby increasing power consumption of the entire system.

SUMMARY

Embodiments of the present invention provide a data processing method, a data processing system and relevant devices, which are capable of reducing system power consumption.

A data processing method in an embodiment of the present invention includes: performing sampling on an analog signal to obtain an analog sample value; performing analog-to-digital conversion on the analog sample value to obtain a digital signal; dividing bits forming the digital signal into at least two bit groups; and turning off output of bits in at least one bit group if a preset turnoff condition is satisfied.

An analog to digital converter in an embodiment of the present invention includes: a sampling unit, configured to perform sampling on an analog signal to obtain an analog sample value; a conversion unit, configured to perform analog-to-digital conversion on the analog sample value to obtain a digital signal; a grouping unit, configured to divide bits forming the digital signal into at least two bit groups; and a turnoff control unit, configured to turn off output of bits in at least one bit group if a preset turnoff condition is satisfied.

A data processing system in an embodiment of the present invention includes: a data processing device and an analog to digital converter; where the data processing device is configured to receive a digital signal output by the analog to digital converter and perform data processing according to the received digital signal.

A base station in an embodiment of the present invention includes an analog to digital converter.

A base station controller in an embodiment of the present invention includes an analog to digital converter.

From the above technical schemes, it can be seen that the embodiments of the present invention offer the following advantage:

In the embodiments of the present invention, after obtaining a digital signal, the ADC may divide bits forming the digital signal into at least two bit groups and turn off output of bits in at least one bit group if a preset turnoff condition is satisfied. Therefore, when the preset turnoff condition is satisfied, the number of bits output by the ADC is reduced, which can reduce the rate of the interface for outputting digital signals on the ADC, and therefore can reduce the operating rate of various data processing devices connected to the ADC, thereby effectively reducing power consumption of the entire system.

DESCRIPTION OF EMBODIMENTS

Embodiments of the present invention provide a data processing method, a data processing system and relevant devices, which are capable of reducing system power consumption.

Figure 1:
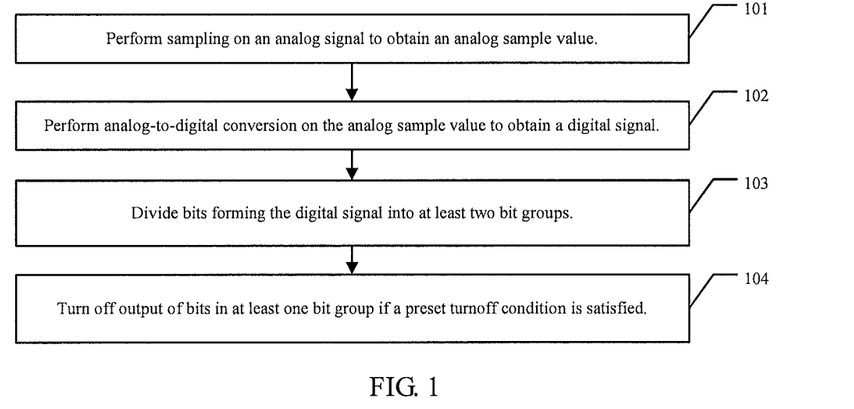
FIG. 1 is a schematic diagram of an embodiment of a data processing method according to the present invention.

Referring to FIG. 1, an embodiment of the data processing method according to the present invention includes:

101: Perform sampling on an analog signal to obtain an analog sample value.

In this embodiment, an ADC performs sampling on an input analog signal based on a preset sampling rate to obtain an analog sample value. The specific sampling process and manner are not limited herein.

102: Perform analog-to-digital conversion on the analog sample value to obtain a digital signal.

After obtaining the analog sample value, the ADC performs analog-to-digital conversion on the analog sample value to obtain a digital signal. Analog-to-digital conversion may be implemented in many manners, which is not limited herein.

After analog-to-digital conversion is performed, each analog sample value is converted into a digital signal consisting of several consecutive bits. The number of bits that each digital signal contains is generally termed resolution of analog-to-digital conversion. The more bits each digital signal contains, the more precisely the digital signal can interpret the analog signal.

103: Divide bits forming the digital signal into at least two bit groups.

After obtaining the digital signal, the ADC divides bits forming the digital signal into at least two or more bit groups. The specific number is not limited herein.

104: Turn off output of bits in at least one bit group if a preset turnoff condition is satisfied.

After dividing bits forming the digital signal into several bit groups, the ADC needs to reduce the number of output bits to reduce system power consumption if the ADC detects that a preset turnoff condition is satisfied. In this case, the ADC may turn off output of bits in at least one bit group.

It should be noted that, in this embodiment, the ADC can detect, in real time, whether a preset turnoff condition is satisfied. The turnoff condition is used to indicate whether the number of output bits needs to be reduced. If the turnoff condition is satisfied, the number of output bits needs to be reduced. If the turnoff condition is not satisfied, the number of output bits does not need to be reduced.

In a practical application, the ADC may detect whether the preset turnoff condition is satisfied in many manners. For example, the ADC performs detection through a locally preset turnoff rule and a current sampling cycle, or performs detection according to whether a triggering signal is received. The specific detection manner is not limited herein.

In this embodiment, after obtaining a digital signal, the ADC may divide bits forming the digital signal into at least two bit groups and turn off output of bits in at least one bit group if a preset turnoff condition is satisfied. Therefore, when the preset turnoff condition is satisfied, the number of bits output by the ADC is reduced, which can reduce the rate of the interface for outputting digital signals on the ADC, and therefore can reduce the operating rate of various data processing devices connected to the ADC, thereby effectively reducing power consumption of the entire system.

Figure 2:
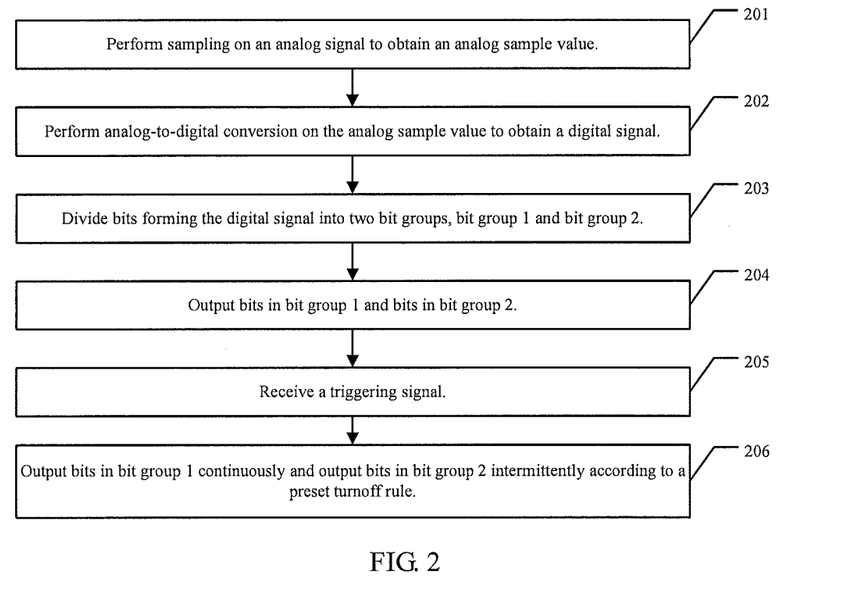
FIG. 2 is a schematic diagram of another embodiment of a data processing method according to the present invention.

For ease of understanding, the data processing method of the present invention is described in details through a specific example. Referring to FIG. 2, another embodiment of the data processing method according to the present invention includes:

201: Perform sampling on an analog signal to obtain an analog sample value.

In this embodiment, an ADC may perform sampling on an input analog signal based on a preset sampling rate to obtain an analog sample value. The specific sampling process and manner are not limited herein.

202: Perform analog-to-digital conversion on the analog sample value to obtain a digital signal.

After obtaining the analog sample value, the ADC may perform analog-to-digital conversion on the analog sample value to obtain the digital signal. Analog-to-digital conversion may be implemented in many manners, which is not limited herein.

After analog-to-digital conversion is performed, each analog sample value is converted into a digital signal consisting of several consecutive bits. The number of bits that each digital signal contains is generally termed resolution of analog-to-digital conversion. The more bits each digital signal contains, the more precisely the digital signal can interpret the sampled analog signal.

203: Divide bits forming the digital signal into a first bit group and a second bit group.

After obtaining the digital signal, the ADC divides bits forming the digital signal into the first bit group and the second bit group based on importance weights.

It should be noted that, the ADC may be connected to various data processing devices, such as a frequency spectrum analyzer and a power analyzer. The data processing device receives a digital signal output by the ADC and performs corresponding data processing, such as frequency spectrum analysis and power analysis.

In this embodiment, the importance weight indicates the impact of each bit in the digital signal on data processing performed by a data processing device. The greater the impact of a bit is, the higher the importance weight of the bit is; and the smaller the impact of a bit is, the lower the importance weight of the bit is.

For each digital signal, the ADC may divide bits forming the digital signal into at least two bit groups based on the importance weight of each bit. An obtained importance weight of each bit group may be the sum or average of the importance weights of all bits in the bit group.

In this embodiment, boundary information about high-order bits and low-order bits may be preset in the ADC. The boundary information may be set by a user according to empirical data, or may be set by the ADC according to a requirement of a data processing device, which is not specifically limited herein.

If each analog sample value corresponds to an N-bit digital signal, and the boundary information is "high X bits are high-order bits and low Y bits are low-order bits", the ADC may group high X bits of the N bits of the digital signal into the first bit group, and group low Y bits of the digital signal into the second bit group. The sum of X and Y is equal to N.

Amplitude of an analog signal indicated by a high-order bit of the digital signal is greater than amplitude of an analog signal indicated by a low-order bit. Therefore, the impact of the high-order bit on data processing performed by the data processing device is greater than the impact of the low-order bit on data processing performed by the data processing device. That is, the importance weight of the high-order bit is higher than the importance weight of the low-order bit.

In this embodiment, the first bit group consists of high-order bits and the second bit group consists of low-order bits. Therefore, the importance weight of the first bit group is higher than the importance weight of the second bit group.

It should be noted that, this embodiment is merely illustrated through the example where bits forming a digital signal are divided into the first bit group and the second bit group. In a practical application, bits forming a digital signal may be divided into more bit groups. For example, bits forming a digital signal may be divided into high-order bits, medium-order bits, and low-order bits to form three bit groups, which is not specifically limited herein.

204: Output bits in the first bit group and bits in the second bit group.

After dividing bits forming the digital signal, the ADC obtains the first bit group and the second bit group, where the first bit group consists of high-order bits and the second bit group consists of low-order bits.

Then, the ADC may output the bits in the first bit group (that is, high-order bits) and the bits in the second bit group (that is, low-order bits).

For ease of describing turnoff control of the ADC, in this embodiment, the ADC may first output all the bits in the first bit group (that is, high-order bits) and all the bits in the second bit group (that is, low-order bits). It should be understood that, in a practical application, the ADC does not need to first output all the bits in the first bit group (that is, high-order bits) and all the bits in the second bit group (that is, low-order bits). Therefore, step 204 in this embodiment is optional.

205: Receive a triggering signal.

When outputting the bits in the first bit group (that is, high-order bits) and the bits in the second bit group (that is, low-order bits), if the ADC receives a triggering signal, it indicates that the number of output bits needs to be reduced to reduce system power consumption. In this case, the ADC can activate turnoff control.

In this embodiment, the triggering signal received by the ADC may be sent by a data processing device, or by a user through a terminal, which is not specifically limited herein.

In this embodiment, the triggering signal may be a signal dedicated for triggering the ADC to activate turnoff control, or be a signal of another type, as long as the ADC recognizes the signal as a triggering signal. For example, when being powered on, a high-power data processing device may send a power-on signal to the ADC, and then, the ADC may recognize the power-on signal as a triggering signal.

It should be noted that, in this embodiment, the triggering signal is sent by an external device or an external network element to the ADC. In a practical application, the ADC may activate the turnoff control after receiving a triggering signal, and may also determine by itself to activate the turnoff control. For example, a timer may be set in the ADC, and the ADC activates turnoff control and resets the timer every time the timer times out. In this way, the ADC can periodically activate turnoff control. Therefore, step 205 in this embodiment is optional.

206: Output bits in the first bit group continuously and output bits in the second bit group intermittently based on a preset turnoff rule.

After activating turnoff control, the ADC may output bits in the first bit group (that is, high-order bits) continuously and output bits in the second bit group (that is, low-order bits) intermittently based on the preset turnoff rule. The turnoff rule is used to indicate a sampling cycle when output needs to be turned off, and/or a sampling cycle when output does not need to be turned off. The turnoff rule may be set according to a requirement of a data processing device, and may also be set according to an empirical value of a user, or according to a power consumption requirement, which is not specifically limited herein.

In each sampling cycle, the ADC obtains an analog sample value, and therefore the ADC also outputs a digital signal in each sampling cycle. It is indicated in the turnoff rule how to perform turnoff control. Specifically, it may be a sampling cycle when output needs to be turned off, and/or a sampling cycle when output does not need to be turned off. For example, it may be "output needs to be turned off in an odd-numbered sampling cycle" or "output does not need to be turned off in an even-numbered sampling cycle".

The ADC can obtain a turnoff identifier according to the turnoff rule and a current sampling cycle. The turnoff identifier is used to indicate whether output needs to be turned off in the current cycle. If the turnoff identifier indicates that output needs to be turned off, the preset turnoff condition is satisfied and the ADC may turn off output of bits in at least one bit group. In this embodiment, the ADC may turn off output of bits in the second bit group in the current cycle. Because bits in a bit group with a lower importance weight have a smaller impact on data processing performed by the data processing device, turning off output of these bits does not have a severe impact on performance of the data processing device.

The ADC may obtain a turnoff identifier in each sampling cycle according to the turnoff rule and the current sampling cycle. If the ADC determines that the turnoff identifier indicates that the output does not need to be turned off in a certain sampling cycle after output of bits in the second bit group has been turned off, a preset resumption condition is satisfied. In this case, the ADC may resume the output of bits in the second bit group.

The turnoff control in the foregoing description is implemented on bits in the second bit group because this embodiment takes two bit groups as an example for illustration. If there are more bit groups, turnoff control may be implemented on bits in a bit group with the lowest importance weight, on bits in two bits groups with lower importance weights, or on bits in bit groups other than the bit group with the highest importance weight. Specific objects of turnoff control are not limited herein.

In step 206 of this embodiment, output of bits in the first bit group (that is, high-order bits) is not limited, and the bits in the first bit group are still output in sequence based on the sampling cycle. The output of these bits can guarantee the basic performance of the data processing device because high-order bits have higher importance weights.

In a practical application, there are some special scenarios. For example, all data processing devices work intermittently based on a certain cycle. Assuming that the sampling rate of an ADC is 1000 Hz, each sampling cycle is 1 ms, and all data processing devices work for 1 ms and stops working for 10 ms, but the input of the analog signal is continuous. In this case, during the 10 ms when all data processing devices stop working, high-order bits output by the ADC are not processed. Therefore, the ADC may set a turnoff rule according to the features of data processing devices, so that output of digital signals is completely turned off when all data processing devices stop working temporarily, and the ADC may resume output of digital signals when the data processing devices work for 1 ms. In this way, the decimation ratio is 1/10.

In this embodiment, the ADC determines a bit group where output of bits is to be turned off according to the values of importance weights. In a practical application, the ADC may also determine a bit group where output of bits is to be turned off according to other factors, for example, the ADC may determine to turn off output of bits in a bit group containing fewest bits according to the number of bits in each bit group, and may also determine to turn off output of bits in a bit group containing the smallest number of bits "1" according to the number of bits in each bit group. The bit group where the output of bits is to be turned off is not specifically limited herein.

In this embodiment, after obtaining a digital signal, the ADC may divide bits forming the digital signal into at least two bit groups based on importance weights and turn off output of bits in a bit group with a lower importance weight if a turnoff condition is satisfied. Therefore, when the turnoff condition is satisfied, the number of bits output by the ADC is reduced, which can reduce the rate of the interface for outputting digital signals on the ADC, and therefore can reduce the operating rate of various data processing devices connected to the ADC, thereby effectively reducing power consumption of the entire system.

In addition, in this embodiment, when the turnoff condition is satisfied, the ADC turns off output of bits in a bit group with a lower importance weight and keeps outputting bits in a bit group with a higher importance weight. Because bits with higher importance weights have a greater impact on data processing performed by a data processing device, continuously outputting bits in a bit group with a higher importance weight can guarantee basic performance of the data processing device while reducing power consumption of the entire system.

The data processing method of the present invention is described through the foregoing embodiments. To describe the data processing process in further detail, some examples in practical applications are used for illustration. The following examples illustrate only one scenario of the data processing process of the present invention. According to the description in the foregoing embodiments, some other similar examples may also be used, which will not be described herein again for the brevity of description.

Figure 3:
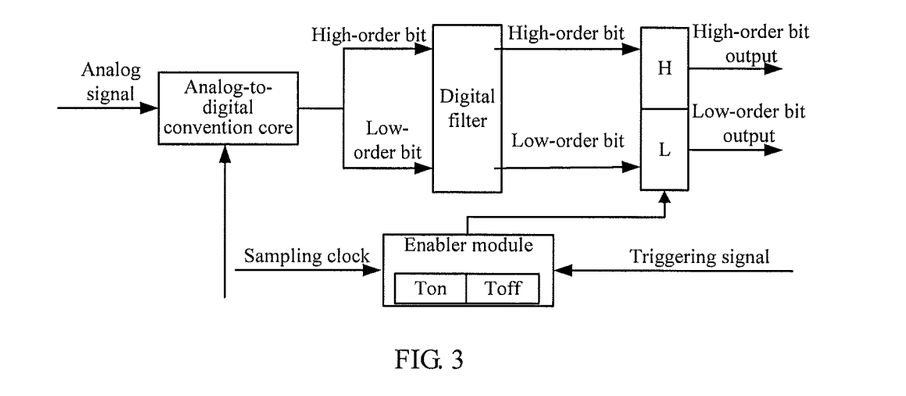
FIG. 3 is a schematic flow chart of data processing according to the present invention.

First, referring to FIG. 3, the data processing process of the present invention is:

(1). An analog signal is input into an analog to digital converter. The analog to digital converter performs sampling on the analog signal according to a sampling clock and converts an analog sample value into a digital signal.

In this embodiment, resolution of analog-to-digital conversion is eight bits, that is, a digital signal corresponding to each analog sample value contains eight bits, and the sampling rate is 1000 Hz, and the sampling cycle is 1 ms.

An analog sample value input to the analog to digital converter ranges from 1 millivolt to 256 millivolts. Since resolution of the analog-to-digital conversion is eight bits, precision of digital signal conversion is $256/2^8=1$ millivolt.

In this embodiment, the relationship between analog sample values and digital signals in the first 10 sampling cycles is shown in Table 1.

TABLE 1

| Sampling Cycle | Analog Sample Value | Digital Signal |
|---|---|---|
| 1 | 122 | 01111010 |
| 2 | 129 | 10000001 |
| 3 | 212 | 11010100 |
| 4 | 175 | 10101111 |
| 5 | 69 | 01000101 |
| 6 | 37 | 00100101 |
| 7 | 88 | 01011000 |
| 8 | 176 | 10110000 |
| 9 | 225 | 11100001 |
| 10 | 149 | 10010101 |

(2). Bits forming the digital signal obtained through analog-to-digital conversion are divided into high-order bits and low-order bits based on boundary information about high-order bits and low-order bits.

In this embodiment, the boundary information about high-order bits and low-order bits is "high six bits are high-order bits and low two bits are low-order bits". Bits divided in each sampling cycle are shown in Table 2.

TABLE 2

| Sampling Cycle | Digital Signal | High-order Bit | Low-order Bit |
|---|---|---|---|
| 1 | 01111010 | 011110 | 10 |
| 2 | 10000001 | 100000 | 01 |
| 3 | 11010100 | 110101 | 00 |
| 4 | 10101111 | 101011 | 11 |

TABLE 2-continued

| Sampling Cycle | Digital Signal | High-order Bit | Low-order Bit |
|---|---|---|---|
| 5 | 01000101 | 010001 | 01 |
| 6 | 00100101 | 001001 | 01 |
| 7 | 01011000 | 010110 | 00 |
| 8 | 10110000 | 101100 | 00 |
| 9 | 11100001 | 111000 | 01 |
| 10 | 10010101 | 100101 | 01 |

(3). A digital filter performs digital filtering on high-order bits and low-order bits.

In this embodiment, the digital filter may be a configurable digital filter. For example, the digital filter may be of a finite impulse response (FIR, Finite Impulse Response) structure, and the filtering bandwidth and coefficient of the filter are configurable. For different scenarios, the digital filter may be configured into an all-pass, low-pass, or bandpass with an out-of-band suppression capability, or may be configured into an anti-aliasing mode, which is not specifically limited herein.

(4). High-order and low-order bits are saved to output buffers.

After digital filtering, high-order bits and low-order bits may be saved to output buffers. Specifically, high-order bits are saved to buffer H and low-order bits are saved to buffer L.

In this embodiment, an output buffer can store eight bits corresponding to one sampling cycle. After the eight bits are output or output of the eight bits is turned off, eight bits corresponding to a next sampling cycle are saved to the output buffer, where:

in the first sampling cycle, buffer H stores high-order bits "011110" and buffer L stores low-order bits "10";

in the second sampling cycle, buffer H stores high-order bits "100000" and buffer L stores low-order bits "01";

in the third sampling cycle, buffer H stores high-order bits "110101" and buffer L stores low-order bits "00";

in the fourth sampling cycle, buffer H stores high-order bits "101011" and buffer L stores low-order bits "11";

in the fifth sampling cycle, buffer H stores high-order bits "010001" and buffer L stores low-order bits "01";

in the sixth sampling cycle, buffer H stores high-order bits "001001" and buffer L stores low-order bits "01"; in the seventh sampling cycle, buffer H stores high-order bits "010110" and buffer L stores low-order bits "00";

in the eighth sampling cycle, buffer H stores high-order bits "101100" and buffer L stores low-order bits "00";

in the ninth sampling cycle, buffer H stores high-order bits "111000" and buffer L stores low-order bits "01"; and in the tenth sampling cycle, buffer H stores high-order bits "100101" and buffer L stores low-order bits "01".

5. An enabler module activates turnoff control according to a triggering signal.

After receiving an external triggering signal, the enabler module may obtain current sampling cycle information according to a sampling clock and activate turnoff control according to the current sampling cycle and a turnoff rule.

In this embodiment, the turnoff rule may be implemented by a Ton counter and a Toff timer in the enabler module, where Ton indicates the number of sampling clocks for which turnoff does not need to be performed and Toff indicates the number of sampling clocks for which turnoff needs to be performed.

In this embodiment, Ton is 3 and Toff is 3, which indicates that after turnoff control is activated, turnoff does not need to be performed in three sampling cycles, and turnoff is performed in the subsequent three sampling cycles.

Figure 4:
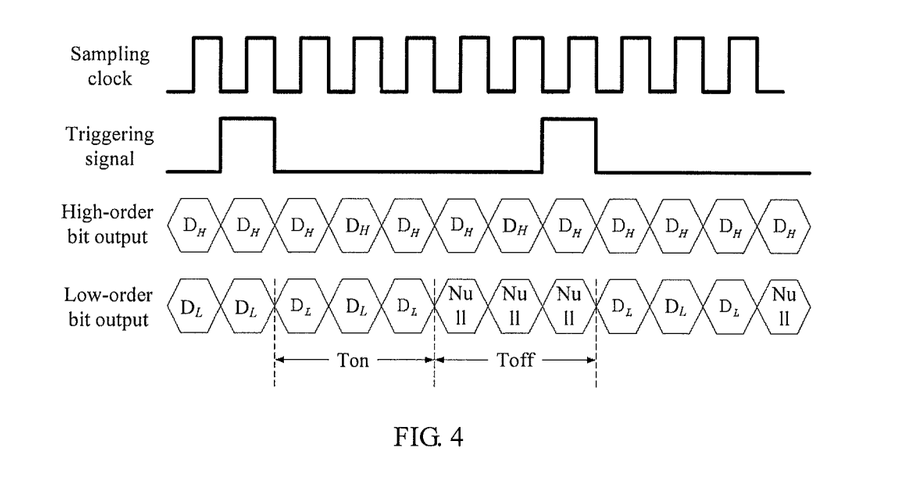
FIG. 4 is a schematic working timing diagram of an interface according to the present invention.

For ease of understanding, referring to FIG. 4, a specific timing diagram of an interface is provided. FIG. 4 shows output of an interface from the first sampling cycle to the twelfth sampling cycle, which is illustrated in the following:

In the first sampling cycle, the enabler module does not receive a triggering signal and does not activate turnoff control. In this case, all high-order bits and low-order bits are output and the output bits are 01111010.

In the second sampling cycle, the enabler module does not receive a triggering signal and does not activate turnoff control. In this case, all high-order bits and low-order bits are output and the output bits are 10000001. At the end of the second sampling cycle, the enabler module detects the falling edge of a triggering signal, which indicates that the enabler module receives a triggering signal. In this case, the enabler module activates turnoff control.

In the third sampling cycle, because turnoff control has been activated, the enabler module obtains a turnoff rule "Ton is 3 and Toff is 3". The current sampling cycle is the first sampling cycle after turnoff control is activated, and Ton is applied, which indicates that turnoff does not need to be performed, all high-order bits and low-order bits are output and the output bits are 11010100.

In the fourth sampling cycle, because turnoff control has been activated, the current sampling cycle is a second sampling cycle after turnoff control is activated, and Ton is applied, which indicates that turnoff does not need to be performed, all high-order bits and low-order bits are output and the output bits are 10101111;

In the fifth sampling cycle, because turnoff control has been activated, the current sampling cycle is a third sampling cycle after turnoff control is activated, and Ton is applied, which indicates that turnoff does not need to be performed, all high-order bits and low-order bits are output and the output bits are 01000101;

In the sixth sampling cycle, because turnoff control has been activated, the current sampling cycle is a fourth sampling cycle after turnoff control is activated, and Toff is applied, which indicates that turnoff needs to be performed, output of low-order bits is turned off, and only high-order bits are output. The output bits are 001001;

In the seventh sampling cycle, because turnoff control has been activated, the current sampling cycle is a fifth sampling cycle after turnoff control is activated, and Toff is applied, which indicates that turnoff needs to be performed, output of low-order bits is turned off, and only high-order bits are output. The output bits are 010110.

In the eighth sampling cycle, because turnoff control has been activated, the current sampling cycle is a sixth sampling cycle after turnoff control is activated, and Toff is applied, which indicates that turnoff needs to be performed, output of low-order bits is turned off, and only high-order bits are output. The output bits are 101100. At the end of the eighth sampling cycle, the enabler module detects the falling edge of a triggering signal, which indicates that the enabler module receives a triggering signal. In this case, the enabler module activates turnoff control.

Turnoff control in the subsequent sampling cycles is performed with reference to the foregoing manners, and is not described herein again.

To illustrate the data process more clearly, the corresponding process of a data processing device is briefly described in the following.

In this embodiment, a data processing device may be a frequency spectrum analyzer, a power analyzer, or a device of another type. Here, only the power analyzer is taken as an example for illustration.

Because the ADC outputs digital signals based on the sampling cycle, the power analyzer should receive eight bits in each sampling cycle. Assuming that a delay of data transmission is not considered, the processing flow of the power analyzer is as follows:

In the first sampling cycle, if the power analyzer receives bits 01111010, the power analyzer performs conversion according to these bits to obtain a corresponding voltage of 122 millivolts, and performs power analysis according to the voltage.

In the second sampling cycle, if the power analyzer receives bits 10000001, the power analyzer can perform conversion according to these bits to obtain a corresponding voltage of 129 millivolts, and performs power analysis according to the voltage.

In the third sampling cycle, if the power analyzer receives bits 11010100, the power analyzer can perform conversion according to these bits to obtain a corresponding voltage of 212 millivolts, and performs power analysis according to the voltage.

In the fourth sampling cycle, if the power analyzer receives bits 10101111, the power analyzer can perform conversion according to these bits to obtain a corresponding voltage of 175 millivolts, and performs power analysis according to the voltage.

In the fifth sampling cycle, if the power analyzer receives bits 01000101, the power analyzer can perform conversion according to these bits to obtain a corresponding voltage of 69 millivolts, and performs power analysis according to the voltage.

In the sixth sampling cycle, the power analyzer receives bits 001001. When the power analyzer fills the bits into digital registers in a descending sequence, no bits are filled into the two lowest order registers because the power analyzer receives only six bits. In this case, the power analyzer ignores contents in the two registers and directly fills the two registers with one 0 for each, and accordingly the bits recovered by the power analyzer are 00100100. The power analyzer performs conversion according to these bits to obtain a corresponding voltage of 36 millivolts, and performs power analysis according to the voltage.

In the seventh sampling cycle, the power analyzer receives bits 010110. When the power analyzer fills the bits into registers in a descending sequence, no bits are filled into the two lowest order registers because the power analyzer receives only six bits. In this case, the power analyzer ignores contents in the two registers and directly fills the two registers with one 0 for each, and accordingly the bits recovered by the power analyzer are 01011000. The power analyzer performs conversion according to these bits to obtain a corresponding voltage of 88 millivolts, and performs power analysis according to the voltage.

In the eighth sampling cycle, the power analyzer receives bits 101100. When the power analyzer fills the bits into registers in a descending sequence, no bits are filled into the two lowest order registers because the power analyzer receives only six bits. In this case, the power analyzer ignores contents in the two registers and directly fills the two registers with one 0 for each, and accordingly the bits recovered by the power analyzer are 10110000. The power analyzer performs conversion according to these bits to obtain a corresponding voltage of 176 millivolts, and performs power analysis according to the voltage.

Data processing in the subsequent sampling cycles is performed with reference to the forgoing manners, and is not described herein again.

It can be seen from the foregoing that, turning off output of low-order bits has a small impact on the power analyzer because low-order bits have lower importance weights. In the foregoing examples, only in the sixth sampling cycle, the voltage recovered by the power analyzer is slightly different from the real value. For process such as power analysis which does not require a precise analysis result, the slight difference can be ignored.

For processing such as frequency spectrum analysis that requires a precise analysis result, all bits may be output.

However, frequency spectrum analysis and power analysis have their own characteristics:

Frequency spectrum analysis, which requires a precise analysis result, is generally performed once during a specific period but is not performed continuously for a long time.

Power analysis, which does not require a precise analysis result, is generally performed continuously to guarantee that the power analysis result can be updated in real time.

Based on the foregoing characteristics, requirements of both frequency spectrum analysis and power analysis can be satisfied simultaneously by setting the Ton counter and the Toff timer in the enabler module. For example, assuming that frequency spectrum analysis is performed once every 10 sampling cycles and digital signals output in five sampling cycles need to be received each time analysis is performed, Ton may be set to 5 and Toff may be set to 10. In addition, since power analysis is continuously performed, the ADC performs turnoff control on output of low-order bits only according to Ton and Toff and keeps outputting high-order bits.

In this embodiment, resolution of analog-to-digital conversion is eight bits, that is, a digital signal corresponding to each analog sample value contains 8 bits and the sampling rate is 1000 Hz. If turnoff control is not performed, the ADC outputs data of 8,000 bits per second, that is, the rate of an interface for outputting digital signals on the ADC is 8 Kbps.

If turnoff control is performed based on the interface timing shown in FIG. 4 in this embodiment, high-order bits (six bits) are output continuously, low-order bits (two bits) are output in three sampling cycles, and output of low-order bits is turned off in the subsequent three sampling cycles. For 1000 sampling cycles, it may be approximately considered that low-order bits are output in 500 sampling cycles and output of low-order bits is turned off in the other 500 sampling cycles.

Therefore, after turnoff control is used, the number of bits output by the ADC per second is: 1000*6+500*2=7000. That is, the rate of an interface for outputting digital signals on the ADC is 7 Kbps.

The foregoing illustration is given through the example where turnoff control is performed based on the interface timing shown in FIG. 4. In a practical application, the decrease in the rate of an interface for outputting digital signals on the ADC varies with values of Ton and Toff. For example, when Ton is set to 5, and Toff is set to 10, it indicates that high-order bits (six bits) are output continuously, low-order bits (two bits) are output in five sampling cycles, and output of low-order bits is turned off in the subsequent 10 sampling cycles. For 1000 sampling cycles, it may be approximately considered that low-order bits are output in 333 sampling cycles and output of low-order bits is turned off in the other 667 sampling cycles.

Therefore, after turnoff control is used, the number of bits output by the ADC per second is: 1000*6+333*2=6666. That is, the rate of an interface for outputting digital signals on the ADC is 6.666 Kbps.

It can be seen from the forgoing comparison that the rate of an interface for outputting digital signals on the ADC can be effectively reduced after turnoff control is used in this embodiment.

In this embodiment, after obtaining a digital signal, the ADC may divide bits forming the digital signal into at least two bit groups based on importance weights and turn off output of bits in a bit group with a lower importance weight if a turnoff condition is satisfied. Therefore, when the turnoff condition is satisfied, the number of bits output by the ADC is reduced, which can reduce the rate of the interface for outputting digital signals on the ADC, and therefore can reduce the operating rate of various data processing devices connected to the ADC, thereby effectively reducing power consumption of the entire system.

Figure 5:
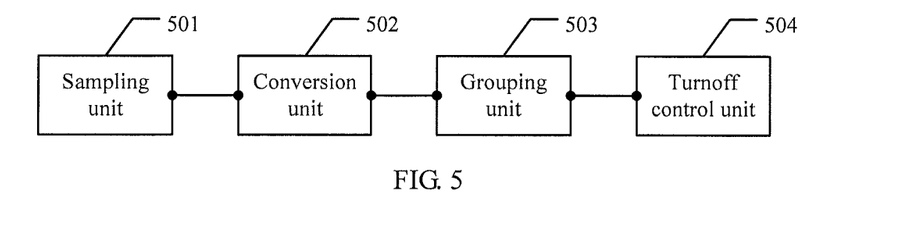
FIG. 5 is a schematic diagram of an embodiment of an analog to digital converter according to the present invention.

An analog to digital converter of the present invention is described in the following. Referring to FIG. 5, an embodiment of an analog to digital converter according to the present invention includes:

a sampling unit 501, configured to perform sampling on an analog signal to obtain an analog sample value;

a conversion unit 502, configured to perform analog-to-digital conversion on the analog sample value to obtain a digital signal;

a grouping unit 503, configured to divide bits forming the digital signal into at least two bit groups; and a turnoff control unit 504, configured to turn off output of bits in at least one bit group if a preset turnoff condition is satisfied.

It should be noted that, in this embodiment, the turnoff control unit 504 can detect, in real time, whether a preset turnoff condition is satisfied. The turnoff condition is used to indicate whether the number of output bits needs to be reduced. If the turnoff condition is satisfied, it indicates that the number of output bits needs to be reduced. If the turnoff condition is not satisfied, it indicates that the number of output bits does not need to be reduced.

In a practical application, the turnoff control unit 504 may detect whether a preset turnoff condition is satisfied in many manners. For example, the turnoff control unit 504 performs detection through a locally preset turnoff rule and a current sampling cycle, or performs detection according to whether a triggering signal is received. The specific detection manner is not limited herein.

Figure 6:
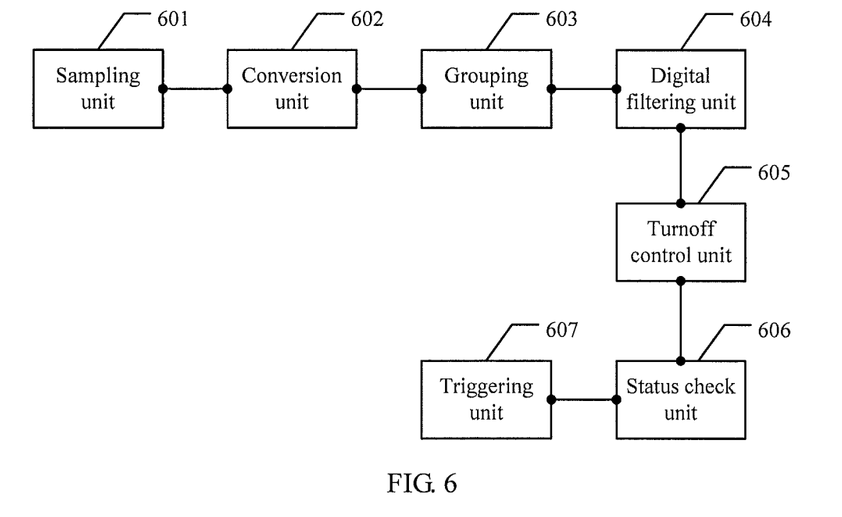
FIG. 6 is a schematic diagram of another embodiment of an analog to digital converter according to the present invention.

An analog to digital converter of the present invention is described in detail in the following. Referring to FIG. 6, another embodiment of an analog to digital converter according to the present invention includes:

a sampling unit 601, configured to perform sampling on an analog signal to obtain an analog sample value;

a conversion unit 602, configured to perform analog-to-digital conversion on the analog sample value to obtain a digital signal;

a grouping unit 603, configured to divide bits forming the digital signal into at least two bit groups based on importance weights;

a digital filtering unit 604, configured to perform anti-aliasing digital filtering on bits in each bit group obtained through division by the grouping unit 603 and output the bits after filtering to a turnoff control unit 605; and the turnoff control unit 605, configured to turn off output of bits in a bit group with a lower importance weight if a preset turnoff condition is satisfied.

In this embodiment, the turnoff control unit 605 is further configured to resume output of bits in a bit group with a lower importance weight if a preset turnoff resumption condition is satisfied.

The analog to digital converter in this embodiment may further include:

a status check unit 606, configured to obtain a turnoff identifier according to a preset turnoff rule and a current sampling cycle, where the preset turnoff rule is used to indicate a sampling cycle when output needs to be turned off, and/or a sampling cycle when output does not need to be turned off; to determine that the preset turnoff condition is satisfied and trigger the turnoff control unit 605 to turn off the output of bits in the bit group with a lower importance weight, if the turnoff identifier indicates that output needs to be turned off; to determine that the preset resumption condition is satisfied and trigger the turnoff control unit 605 to resume the output of bits in the bit group with a lower importance weight, if the turnoff identifier indicates that output does not need to be turned off.

It should be noted that, in this embodiment, a turnoff rule may be preset locally in the analog-to-digital converter and the status check unit 606 may obtain the turnoff rule from the analog-to-digital converter. The status check unit 606 may also be connected to a sampling clock to determine a current sampling cycle according to the sampling clock signal.

The analog to digital converter in this embodiment may further include:

a triggering unit 607, configured to trigger the status check unit 606 according to a received triggering signal to perform a corresponding operation.

In this embodiment, the grouping unit 603 divides bits forming a digital signal into at least two bit groups based on importance weights and the turnoff control unit 605 turns off output of bits in a bit group with a lower importance weight if a preset turnoff condition is satisfied. That is, bit groups where output of bits is to be turned off are determined according to the values of importance weights in this embodiment. In a practical application, a bit group where output of bits is to be turned off may also be determined according to other factors. Bit groups where output of bits is to be turned off may be determined according to the number of bits in each bit group, for example, output of bits in a bit group containing fewest bits may be determined to be turned off based on the number of bits in each bit group, and output of bits in a bit group containing the smallest number of bits "1" may also be determined to be turned off based on the number of bits in each bit group. The bit group where the output of bits is to be turned off is not specifically limited herein.

For ease of understanding, the relationship among units in the analog-to-digital converter in this embodiment is illustrated in the following through a specific application scenario:

In this embodiment, the sampling unit 601 may perform sampling on an input analog signal based on a preset sampling rate to obtain an analog sample value. The specific sampling process and manner are not limited herein.

After the sampling unit 601 obtains the analog sample value, the conversion unit 602 performs analog-to-digital conversion on the analog sample value to obtain a digital signal. Analog-to-digital conversion may be implemented in many manners, which is not limited herein.

After analog-to-digital conversion is performed, each analog sample value is converted into a digital signal consisting of several consecutive bits. The number of bits that each digital signal contains is generally termed resolution of analog-to-digital conversion. The more bits each digital signal contains, the more precisely the digital signal can interpret the sampled analog signal.

After the conversion unit 602 obtains the digital signal, the grouping unit 603 divides bits forming the digital signal into at least two or more bit groups based on importance weights. The specific number is not limited herein.

It should be noted that, the ADC may be connected to various data processing devices, such as a frequency spectrum analyzer and a power analyzer. The data processing device receives a digital signal output by the ADC and performs corresponding data processing, such as frequency spectrum analysis and power analysis.

In this embodiment, the importance weight indicates the impact of each bit in the digital signal on data processing performed by the data processing device. The greater the impact of a bit is, the higher the importance weight of the bit is; and the smaller the impact of a bit is, the lower the importance weight of the bit is.

The grouping unit 603 may divide bits into bit groups based on importance weights of the bits in sequence. Therefore, importance weights of the obtained bit groups vary.

After the grouping unit 603 divides bits into several bit groups, the digital filtering unit 604 may perform anti-aliasing digital filtering on bits in each bit group obtained through division by the grouping unit 603. Then, if the turnoff control unit 605 detects that a preset turnoff condition is satisfied, it indicates that the number of output bits needs to be reduced, so as to reduce system power consumption. For example, the turnoff control unit 605 may turn off output of bits in a bit group with a lower importance weight. Because bits in a bit group with a lower importance weight have a smaller impact on data processing performed by the data processing device, turning off output of these bits does not have a severe impact on performance of the data processing device.

After turning off output of bits in a bit group with a lower importance weight, the turnoff control unit 605 may resume output of bits in the bit group with a lower importance weight if a preset resumption condition is satisfied.

In this embodiment, the status check unit 606 may determine whether a preset turnoff condition and a preset resumption condition are satisfied. Specifically, the status check unit 606 may obtain a turnoff identifier according to a preset turnoff rule and a current sampling cycle. The preset turnoff rule is used to indicate a sampling cycle when output needs to be turned off, and/or a sampling cycle when output does not need to be turned off. If the turnoff identifier indicates that output of bits needs to be turned off, it is determined that a preset turnoff condition is satisfied, and the turnoff control unit 605 is triggered to turn off output of bits in a bit group with a lower importance weight. If the turnoff identifier indicates that output of bits does not need to be turned off, it is determined that a preset resumption condition is satisfied, and the turnoff control unit 605 is triggered to resume output of bits in a bit group with a lower importance weight.

It should be noted that, in this embodiment, the triggering unit 607 may trigger the status check unit 606 to perform a corresponding operation. When receiving a triggering signal, the triggering unit 607 triggers the status check unit 606 to perform a corresponding operation.

In this embodiment, after the conversion unit 602 obtains a digital signal, the grouping unit 603 may divide bits forming the digital signal into at least two bit groups and the turnoff control unit 605 may turn off output of bits in at least one bit group if a turnoff condition is satisfied. Therefore, when the turnoff condition is satisfied, the number of bits output by the ADC is reduced, which can reduce the rate of the interface for outputting digital signals on the ADC, and therefore can reduce the operating rate of various data processing devices connected to the ADC, thereby effectively reducing power consumption of the entire system.

In addition, when a turnoff condition is satisfied in this embodiment, the turnoff control unit 605 turns off output of bits in a bit group with a lower importance weight and keeps outputting bits in a bit group with a higher importance weight. Because bits with higher importance weights have a greater impact on data processing performed by a data processing device, continuously outputting bits in a bit group with a higher importance weight can guarantee basic performance of the data processing device while reducing power consumption of the entire system.

Figure 7:
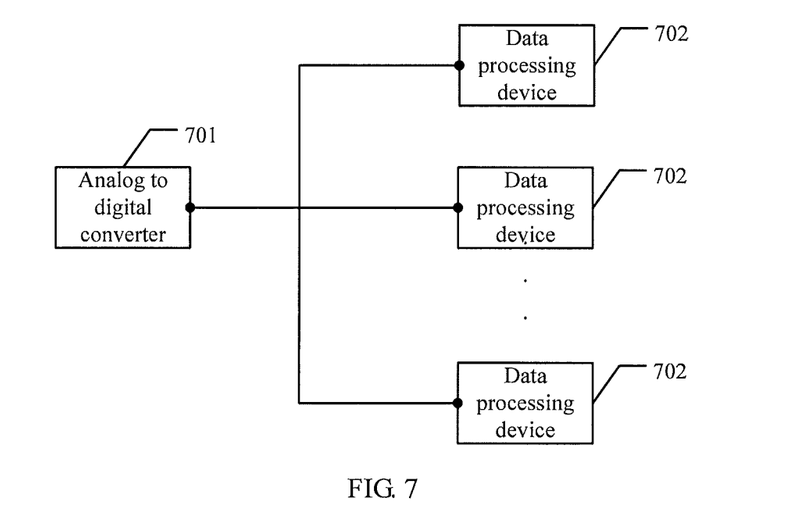
FIG. 7 is a schematic diagram of an embodiment of a data processing system according to the present invention.

Referring to FIG. 7, an embodiment of the data processing system according to the present invention includes:

an analog to digital converter 701 and several data processing devices 702.

In this embodiment, the analog to digital converter 701 may be similar to the analog to digital converters described in FIG. 5 and FIG. 6 and therefore is not described herein again.

In this embodiment, the data processing device 702 is configured to receive a digital signal output by the analog to digital converter 701 and performs data processing according to the received digital signal.

In a practical application, the data processing system in this embodiment can be implemented in a base station, a base station controller, or other network elements. The analog to digital converter may be implemented by a board that has collection and conversion functions; and the data processing device may be implemented by various boards.

It may be understood that, in the data processing system in this embodiment, the analog to digital converter may be located in a base station or a base station controller. The analog to digital converter may be implemented by a board that has collection and conversion functions. The data processing device may be located in different network elements. The specific implementation manner is not limited herein.

This embodiment also provides a base station and a base station controller:

In this embodiment, the base station at least includes an analog to digital converter, which is similar to the analog to digital converter described in FIG. 5 or FIG. 6 and therefore is not described herein again.

In this embodiment, the base station controller at least includes an analog to digital converter, which is similar to the analog to digital converter described in FIG. 5 or FIG. 6 and therefore is not described herein again.

Besides the analog to digital converter, the base station and the base station controller in this embodiment may further include other communication modules, which are not specifically limited herein.

A person of ordinary skill in the art may understand that all or part of the steps of the method according to the embodiments of the present invention may be implemented by a program instructing relevant hardware. The program may be stored in a computer readable storage medium, and the storage medium may be a read-only memory, a magnetic disk, or an optical disk or the like.

A data processing method, a data processing system, and relevant devices that are provided in the embodiments of the present invention are introduced in detail in the foregoing. A person of ordinary skill in the art may make modifications to the specific implementation manners and application scopes according to the ideas of the embodiments of the present invention. Therefore, the content of the specification shall not be construed as a limitation to the present invention.

What is claimed is:

1. A data processing method, comprising:
   receiving, by an analog to digital converter (ADC), an analog signal through an input port;
   performing, by the ADC, sampling on the analog signal to obtain an analog sample value;
   performing, by the ADC, analog-to-digital conversion on the analog sample value to obtain a digital signal;
   dividing, by the ADC, bits forming the digital signal into at least two bit groups based on importance weights of each bit;
   turning off, by the ADC, output of bits in at least one bit group with a lower importance weight when a preset turnoff condition is satisfied; and
   outputting, by the ADC, bits which are not turned off if there are any through an output port.

2. The method according to claim 1, further comprising:
   obtaining, by the ADC, a turnoff identifier in accordance with a preset turnoff rule and a current sampling cycle, wherein the preset turnoff rule is used to indicate a sampling cycle when the output needs to be turned off, or a sampling cycle when the output does not need to be turned off; and
   when the turnoff identifier indicates that the output needs to be turned off, determining that the preset turnoff condition is satisfied.

3. The method according to claim 1, wherein after the turning off output of bits in at least one bit group, comprising:
   resuming, by the ADC, output of bits in the bit group where the output of bits has been turned off if a preset resumption condition is satisfied.

4. The method according to claim 3, further comprising:
   obtaining, by the ADC, the turnoff identifier in accordance with the preset turnoff rule and the current sampling cycle, wherein the turnoff rule is used to indicate a sampling cycle when the output needs to be turned off, or a sampling cycle when the output does not need to be turned off; and
   if the turnoff identifier indicates that the output does not need to be turned off, determining, by the ADC, that the preset resumption condition is satisfied.

5. The method according to claim 1, wherein before the obtaining a turnoff identifier in accordance with a preset turnoff rule and a current sampling cycle, comprising:
   according to a received triggering signal, triggering, by the ADC, the step of obtaining the turnoff identifier.

6. The method according to claim 1, wherein each analog sample value corresponds to an N-bit digital signal; and
   the dividing, by the ADC, bits forming the digital signal into at least two bit groups based on importance weights comprises:
   grouping, by the ADC, the higher X bits forming the digital signal as a first bit group, and grouping, by the ADC, the lower Y bits forming the digital signal as a second bit group, wherein the sum of X and Y is equal to N; and
   the importance weight of the first bit group being higher than the importance weight of the second bit group.

7. The method according to claim 6, wherein turning off, by the ADC, output of bits in at least one bit group with a lower importance weight comprises:
   turning off output of bits in the second bit group, or turning off output of bits in both the first bit group and the second bit group.

8. The method according to claim 1, wherein after the dividing, by the ADC, bits forming the digital signal into at least two bit groups and before the turning off output of bits in at least one bit group, comprising:
   performing, by the ADC, anti-aliasing digital filtering on bits in each bit group.

9. An analog to digital converter, comprising:
- an input port, configured to receive an analog signal;
- a sampling unit, configured to perform sampling on the received analog signal to obtain an analog sample value;
- a conversion unit, configured to perform analog-to-digital conversion on the analog sample value to obtain a digital signal;
- a grouping unit, configured to divide bits forming the digital signal into at least two bit groups based on importance weights of each bit;
- a turnoff control unit, configured to turn off output of bits in at least one bit group with a lower importance weight if a preset turnoff condition is satisfied; and
- an output port, configured to output bits which are not turned off if there are any.

10. The analog to digital converter according to claim 9, wherein the turnoff control unit is further configured to resume output of bits in the bit group where the output of bits has been turned off if a preset resumption condition is satisfied.

11. The analog to digital converter according to claim 9, further comprising:
- a status check unit, configured to obtain a turnoff identifier in accordance with a preset turnoff rule and a current sampling cycle, wherein the preset turnoff rule is used to indicate a sampling cycle when the output needs to be turned off, or a sampling cycle when the output does not need to be turned off; to determine that the preset turnoff condition is satisfied and trigger the turnoff control unit to turn off the output of bits in at least one bit group, when the turnoff identifier indicates that output needs to be turned off.

12. The analog to digital converter according to claim 9, further comprising:
- a status check unit, configured to obtain a turnoff identifier in accordance with a preset turnoff rule and a current sampling cycle, wherein the preset turnoff rule is used to indicate a sampling cycle when the output needs to be turned off, or a sampling cycle when the output does not need to be turned off, to determine that the preset resumption condition is satisfied and trigger the turnoff control unit to resume the output of bits in the bit group where the output of bits has been turned off, when the turnoff identifier indicates that output does not need to be turned off.

13. The analog to digital converter according to claim 11, further comprising:
- a triggering unit, configured to trigger the status check unit according to a received triggering signal to perform a corresponding operation which the status check unit is configured to.

14. The analog to digital converter according to claim 9, further comprising:
- a digital filtering unit, configured to perform anti-aliasing digital filtering on bits in each bit group obtained through division by the grouping unit, and output bits after filtering to the turnoff control unit.

15. A base station, comprising an analog to digital converter, the analog to digital converter comprising:
- an input port, configured to receive an analog signal;
- a sampling unit, configured to perform sampling on the received analog signal to obtain an analog sample value;
- a conversion unit, configured to perform analog-to-digital conversion on the analog sample value to obtain a digital signal;
- a grouping unit, configured to divide bits forming the digital signal into at least two bit groups;
- a turnoff control unit, configured to turn off output of bits in at least one bit group of the at least two bit groups if a preset turnoff condition is satisfied; and
- an output port, configured to output bits which are not turned off if there are any;
- wherein the turnoff control unit is further configured to resume output of bits in the bit group where the output of bits has been turned off is a preset resumption condition is satisfied.

16. The base station according to claim 15, further comprising:
- a status check unit, configured to obtain a turnoff identifier in accordance with a preset turnoff rule and a current sampling cycle, wherein the preset turnoff rule is used to indicate a sampling cycle when the output needs to be turned off, or a sampling cycle when the output does not need to be turned off; to determine that the preset turnoff condition is satisfied and trigger the turnoff control unit to turn off the output of bits in at least one bit group, when the turnoff identifier indicates that output needs to be turned off.

17. The method according to claim 1, wherein the importance weight of each bit indicates impact of each bit in the digital signal on data processing performed by a data processing device connected to the analog to digital converter, and an importance weight of a bit group is a sum or average of importance weights of all bits in the bit group.

18. The analog to digital converter according to claim 9, wherein the importance weight of each bit indicates impact of each bit in the digital signal on data processing performed by a data processing device connected to the analog to digital converter, and an importance weight of a bit group is a sum or average of importance weights of all bits in the bit group.

19. The analog to digital converter according to claim 9,
- wherein each analog sample value corresponds to an N-bit digital signal;
- wherein the grouping unit is further configured to group the higher X bits forming the digital signal as a first bit group, and group the lower Y bits forming the digital signal as a second bit group, wherein the sum of X and Y is equal to N; and
- wherein the importance weight of the first bit group being higher than the importance weight of the second bit group.

20. The analog to digital converter according to claim 19, wherein the turnoff control unit is further configured to turn off output of bits in the second bit group, or turned off output of bits in both the first bit group and the second bit group if the preset turnoff condition is satisfied.

21. The analog to digital converter according to claim 9, wherein the analog to digital converter is in a base station or a base station controller.

22. The base station according to claim 15, wherein the analog to digital converter further comprises:
- a digital filtering unit, configured to perform anti-aliasing digital filtering on bits in each bit group obtained through division by the grouping unit, and output bits after filtering to the turnoff control unit.

23. A base station, comprising an analog to digital converter, the analog to digital converter comprising:
- an input port, configured to receive an analog signal;
- a sampling unit, configured to perform sampling on the received analog signal to obtain an analog sample value;
- a conversion unit, configured to perform analog-to-digital conversion on the analog sample value to obtain a digital signal;

a grouping unit, configured to divide bits forming the digital signal into at least two bit groups;

a turnoff control unit, configured to turn off output of bits in at least one bit group of the at least two bit groups if a preset turnoff condition is satisfied;

an output port, configured to output bits which are not turned off if there are any; and a status check unit, configured to obtain a turnoff identifier in accordance with a preset turnoff rule and a current sampling cycle, wherein the preset turnoff rule is used to indicate a sampling cycle when the output needs to be turned off, or a sampling cycle when the output does not need to be turned off; to determine that the preset turnoff condition is satisfied and trigger the turnoff control unit to turn off the output of bits in at least one bit group, when the turnoff identifier indicates that output needs to be turned off.

24. The base station according to claim 23, further comprising:

a triggering unit, configured to trigger the status check unit according to a received triggering signal to perform a corresponding operation which the status check unit is configured to.

\* \* \* \* \*

UNITED STATES PATENT AND TRADEMARK OFFICE
CERTIFICATE OF CORRECTION

PATENT NO. : 9,058,171 B2  
APPLICATION NO. : 13/955235  
DATED : June 16, 2015  
INVENTOR(S) : Yong Wang et al.

Page 1 of 1

It is certified that error appears in the above-identified patent and that said Letters Patent is hereby corrected as shown below:

Title page, Item 73 (Assignee):

Delete "(KR)" and insert --(CN)--, therefore.

Signed and Sealed this
Second Day of February, 2016

Michelle K. Lee
*Director of the United States Patent and Trademark Office*